United States Patent

Jung et al.

[11] Patent Number: 6,078,857
[45] Date of Patent: Jun. 20, 2000

[54] APPARATUS FOR DECIDING A SHIFT PATTERN SUITABLE FOR A DRIVER'S DRIVING HABIT USING NEURAL NETWORK OPERATION AND FUZZY INFERENCE AND A CONTROL METHOD THEREOF

[75] Inventors: Soo-Yong Jung; Hun Kang, both of Seoul, Rep. of Korea

[73] Assignee: Hyundai Motor Company, Seoul, Rep. of Korea

[21] Appl. No.: 08/996,700

[22] Filed: Dec. 23, 1997

Related U.S. Application Data

[63] Continuation-in-part of application No. 08/545,069, Oct. 19, 1995, abandoned.

[51] Int. Cl.[7] .................................................. G05B 13/00
[52] U.S. Cl. .............................. 701/59; 701/1; 701/51; 701/117; 701/48; 706/20; 706/25
[58] Field of Search ........................... 706/20, 25; 701/48

[56] References Cited

U.S. PATENT DOCUMENTS

| | | | |
|---|---|---|---|
| 5,168,550 | 12/1992 | Sakaue et al. | 706/25 |
| 5,285,523 | 2/1994 | Takahashi | 706/20 |
| 5,410,477 | 4/1995 | Ishii et al. | 701/48 |
| 5,428,531 | 6/1995 | Hayafune . | |
| 5,483,446 | 1/1996 | Momose et al. . | |
| 5,510,982 | 4/1996 | Ohnishi et al. . | |
| 5,519,610 | 5/1996 | Tsutsui et al. . | |
| 5,566,072 | 10/1996 | Momose et al. . | |
| 5,618,243 | 4/1997 | Kondo et al. . | |

OTHER PUBLICATIONS

Sakaguchi et al., Application of fuzzy logic to shift scheduling method for automatic transmission, Second IEEE International conference on fuzzy systems, pp. 52–58.

Weil et al., Fuzzy expert system for automatic transmission control, First IEE conference on control applications, pp. 716–721.

Primary Examiner—Tariq R. Hafiz
Assistant Examiner—Edward G. Brown
Attorney, Agent, or Firm—Finnegan, Henderson, Farabow, Garrett & Dunner, LLP

[57] ABSTRACT

An apparatus for deciding a shift pattern suitable for a driver's habit using a neural network operation and fuzzy inference and a control method thereof which perform a neural network operation by inputting a driver's driving operation quantity as a deciding condition of a shift pattern, and decide an optimal shift pattern by performing fuzzy inference from the output from the a neural network operation.

12 Claims, 5 Drawing Sheets

APPARATUS FOR DECIDING A SHIFT PATTERN SUITABLE FOR A DRIVER'S DRIVING HABIT USING NEURAL NETWORK OPERATION AND FUZZY INFERENCE AND A CONTROL METHOD THEREOF

This application is a continuation-in-part application of application having Ser. No. 08/545,069, filed Oct. 19, 1995, now abandoned.

BACKGROUND OF THE INVENTION (a) Field of the Invention

The present invention relates to an apparatus for deciding a shift pattern suitable for a driver's driving habit using a neural network operation and fuzzy inference and a control method thereof. More particularly, the present invention relates to an apparatus for deciding a shift pattern suitable for a driver's driving habit using a neural network operation and fuzzy inference and a control method thereof which perform a neural network operation from a driving operation quantity used as a factor to determine a shift pattern, and decide an optimal shift pattern by performing a fuzzy inference from the output from the neural network operation.

(b) Description of the Related Art

In the case of a conventional automatic transmission (AT), driver's driving habit is not considered when deciding a shift pattern of the AT, and therefore the shift pattern is decided regardless of the driver's driving habit. Accordingly. it is difficult to decide an optimal shift stage in deciding the shift pattern of the conventional AT.

SUMMARY OF THE INVENTION

An object of the present invention is to provide an apparatus for deciding a shift pattern suitable for a driver's driving habit using a neural network operation and fuzzy inference and a control method thereof to substantially obviate one or more of the problems due to limitations and disadvantages of the related art.

According to one aspect of the present invention, a shift pattern deciding apparatus includes:

a driving operation quantity sensor for sensing a driver's driving operation quantity and outputting a driving operation quantity vector X[k];

a moving-average calculator for receiving the vector X[k] and calculating a moving-average vector M[k];

a network operator for receiving the vector X[k], performing a neural network operation and outputting a network output vector NET;

a neural network learning algorithm unit for receiving an error vector E, which subtracts the vector NET from the vector M[k], performing a neural network learning, and feeding back a learned result to the network operator; and a fuzzy inference unit for receiving the network output vector NET, performing a fuzzy inference, and deciding an optimal shift pattern suitable for the driving habit of the driver.

According to another aspect of the present invention, a shift pattern deciding apparatus includes:

a driving operation quantity sensor for sensing driver's driving operation quantity and outputting a driving operation quantity vector X[k];

a moving-average calculator for receiving the vector X[k] and calculating a moving-average vector M[k];

a network operator for receiving the vector X[k], performing a neural network operation and outputting a network output vector NET;

a threshold logic unit for receiving the network output vector NET, and outputting logic vector Y of 0 or 1 after comparing the inputted network output vector NET with a predetermined threshold value;

a neural network learning algorithm unit for receiving an error vector, E which subtracts the vector Y from the vector M[k], performing a neural network learning, and feeding back a learned result to the network operator; and a fuzzy inference unit for receiving the network output vector Y, performing a fuzzy inference, and deciding an optimal shift pattern suitable for the driving habit of the driver.

In the shift pattern deciding apparatus of the present invention, the moving-average vector M[k] is obtained by a following expression using the driving operation quantity vector X[k] and n delay driving operation quantity vector X[k−n] which the driving operation vector X[k] is delayed by n;

$$M[k] = M[k-1] + \frac{1}{n}(X[k] - X[k-n])$$

According to still another aspect of the present invention, a method for deciding a shift pattern, comprising the steps of:

sensing driver's driving operation quantity and outputting a driving operation quantity vector X[k]:

receiving the vector X[k] and calculating a moving-average vector M[k];

outputting a network output vector NET by multiplying the driving operation quantity vector X[k] by a weighting coefficient matrix W;

outputting logic vector Y of 0 or 1 after comparing the inputted network output vector NET with a predetermined threshold value:

obtaining an error vector E which subtracts the vector Y from the vector M[k], and obtaining an update weighting coefficient matrix dW by multiplying the error vector E by a learning rate η;

modifying the weighting coefficient matrix by adding the update weighting coefficient matrix dW to the weighting coefficient matrix W; and receiving the logic vector Y, performing a fuzzy inference, and deciding an optimal shift pattern suitable for the driving habit of the driver.

Additional objects and advantages of the present invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings illustrate embodiments of the present invention and, together with the description, serve to explain the principles of the invention.

DETAILED DESCRIPTION OF THE PREFERRED EMBODIMENTS

Embodiments of the present invention will become apparent from a study of the following detailed description when viewed in light of the drawings.

Figure 1:
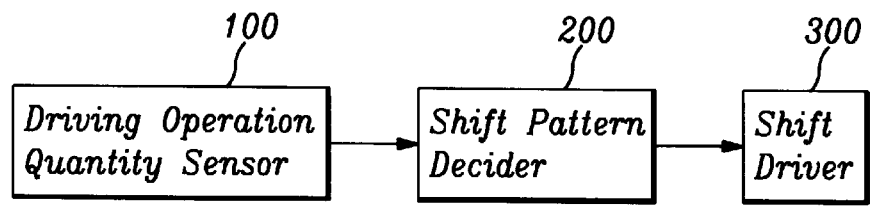
FIG. 1 is a schematic block diagram of a construction of a shift pattern deciding apparatus according to an embodiment of the present invention.

FIG. 1 is a schematic block diagram of a construction of a shift pattern deciding apparatus according to an embodiment of the present invention.

As illustrated in FIG. 1, the shift pattern deciding apparatus includes a driving operation quantity sensor 100, a shift pattern decider 200 and a shift driver 300. The driving operation quantity sensor 100 senses a driver's driving operation quantity, represents the driving operation quantity as a number, and applies a value for the driving operation quantity to the shift pattern decider 200. The shift pattern decider 200 decides an optimal shift pattern suitable for the driver's driving habit by performing a neural network operation and fuzzy inference for the inputted driving operation quantity. The shift driver 300 controls the shift pattern of an automatic transmission (AT) according to the shift pattern decided by the shift pattern decider 200.

Figure 2:
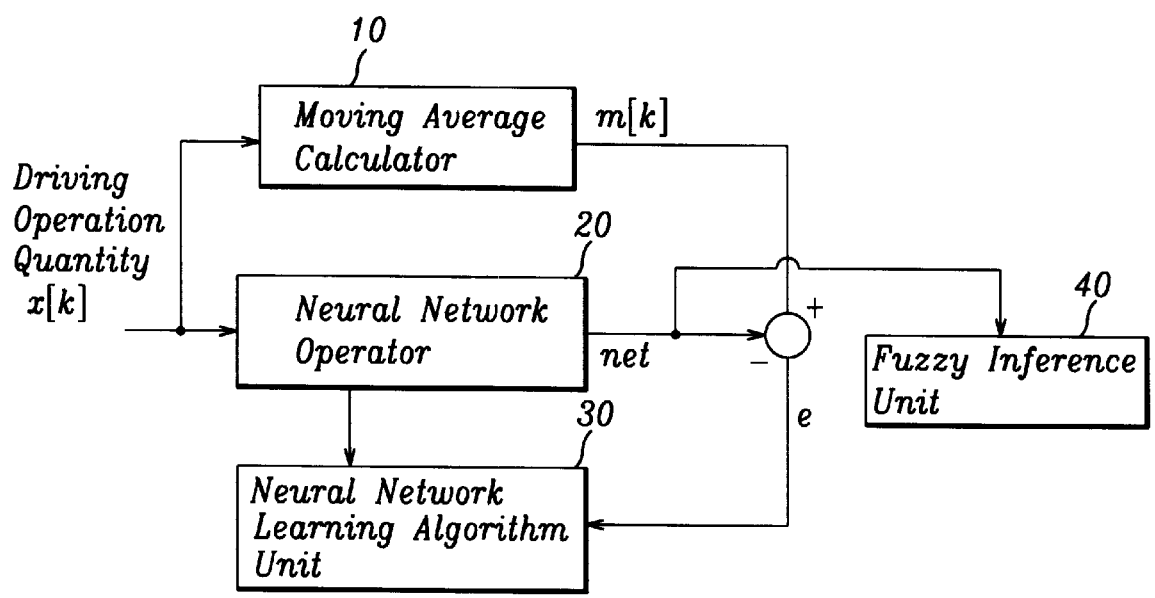
FIG. 2 is a view of a shift pattern decider according to a first embodiment of the present invention.

FIG. 2 is a view of the shift pattern decider according to the first embodiment of the present invention.

As illustrated in FIG. 2, the shift pattern decider 200 includes a moving-average calculator 10, a neural network operator 20, a neural network learning algorithm unit 30 and a fuzzy inference unit 40.

In FIG. 2, the driving operation quantity, x[k] sensed by the driving operation quantity sensor 100 in step k is inputted to the moving-average calculator 10 and the neural network operator 20 at the same time. The moving-average calculator 10 obtains a moving-average value m[k] from the inputted driving operation quantity x[k] in step k, and the neural network operator 20 outputs a network output value, net after performing a neural network operation of the driving operation quantity x[k].

A difference e(=m[k]−net) between the moving-average value outputted from the moving-average calculator 10 and the network output value, net outputted from the neural network operator 20, is inputted to the neural network learning algorithm unit 30. The neural network learning algorithm unit 30 performs a neural network learning using an error signal, e, and feeds back a learned result of the learning algorithm to the neural network operator 20.

The output value, net outputted from the neural network operator 20 is inputted to the fuzzy inference unit 40, and the fuzzy inference unit 40 decides the optimal shift pattern suitable for the driver's driving habit on the basis of the network output value, net.

In FIG. 2, the moving-average value m[k] in step k is calculated based on a following expression.

$$m[k] = \frac{1}{n}\sum_{i=0}^{n-1} x[k-i] \quad (1)$$

where x[k−i] is the driving operation quantity in step k−i. As noted in expression 1, the moving-average value m[k] in step k means the average value of the driving operation quantity x[k] in step k and the driving operation quantity x[k−1], x[k−2], . . . , x[k−n+1] in previous steps.

Figure 3:
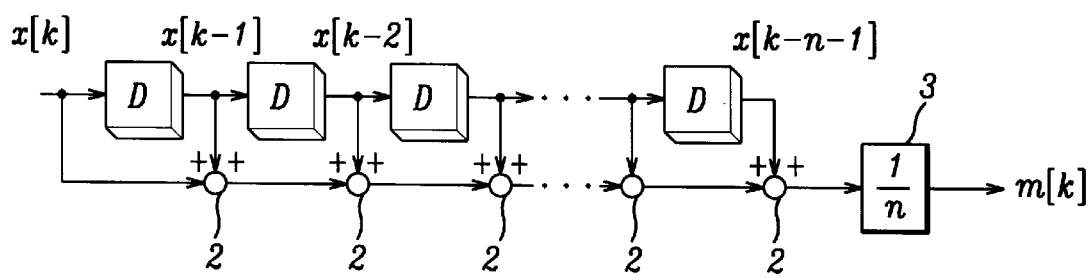
FIG. 3 is a view of one example of a moving-average calculator illustrated in FIG. 2.

FIG. 3 illustrates that the moving-average value, m[k] obtained by expression 1 is applied to the moving-average calculator.

In FIG. 3, the moving-average calculator 10 includes an n−1 number of adders 2, one coefficient multiplier 3, and an n−1 number of unit delay elements D which delays the driving operation quantity by one step. The driving operation quantity x[k] is successively delayed by the n−i number of unit delay elements which are serially connected, and the driving operation quantity x[k] and the driving operation quantity (x[k−1], x[k−2], . . . , x[k−3]) are added by the n−1 number of adders 2. The coefficient adder 3 outputs the moving-average value m[k] by dividing a value (x[k]+x[k−1]+, . . . , +x[k−n+1]) which is added by the adder 2 by n.

On the other hand, a following expression may be calculated based on expression 1.

$$m[k-1] = \frac{1}{n}\sum_{j=0}^{n-1} x[k-1-j] = \frac{1}{n}\sum_{i=1}^{n} x[k-i] \quad (2)$$

where i=j+1.

Expression 3 and expression 4 may be calculated respectively based on expression 1 and expression 2.

$$m[k] = \frac{1}{n}\sum_{i=1}^{n-1} x[k-i] + \frac{1}{n}x[k] \quad (3)$$

$$m[k-1] = \frac{1}{n}\sum_{i=1}^{n-1} x[k-i] + \frac{1}{n}x[k-n] \quad (4)$$

Expression 5 may be obtained by subtracting expression 4 from expression 3.

$$m[k] = m[k-1] + \frac{1}{n}(x[k] - x[k-n]) \quad (5)$$

Figure 4:
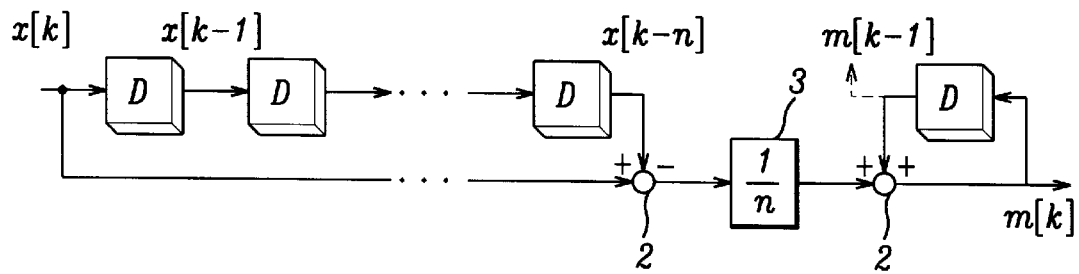
FIG. 4 is a view of another example of the moving-average calculator illustrated in FIG. 2.

FIG. 4 illustrates that the moving-average value m[k] obtained by expression 5 is applied to the moving-average calculator.

As illustrated in FIG. 4, the moving-average calculator includes the n+1 number of unit delay elements D, two adders 2 and one coefficient multiplier 3. The driving operation quantity x[k] becomes x[k−n] through the n number of unit delay elements which are serially connected, and the coefficient multiplier 3 outputs a value of x[k]−x[k−n] by subtracting the driving operation quantity x[k−n] delayed by n from the driving operation quantity x[k]. The value of x[k]−x[k−n] is inputted to the coefficient multiplier 3, and divided by the n value, thereby obtaining the moving-average value m[k]. Here, the moving-average value m[k] is delayed through the unit delay elements D, and the delayed value, m[k−1] is fed back and added to the output value of the coefficient multiplier 3.

The moving-average calculator illustrated in FIG. 4 has an advantage in that it is easy and simple to obtain the moving-average value by adding the two unit delay elements to the moving-average calculator illustrated in FIG. 3, delaying the output signal of the moving-average value and feeding back the delayed output signal of the moving-average value.

In addition, the moving-average calculator illustrated in FIG. 4 may be formed by a ring buffer.

Figure 5:
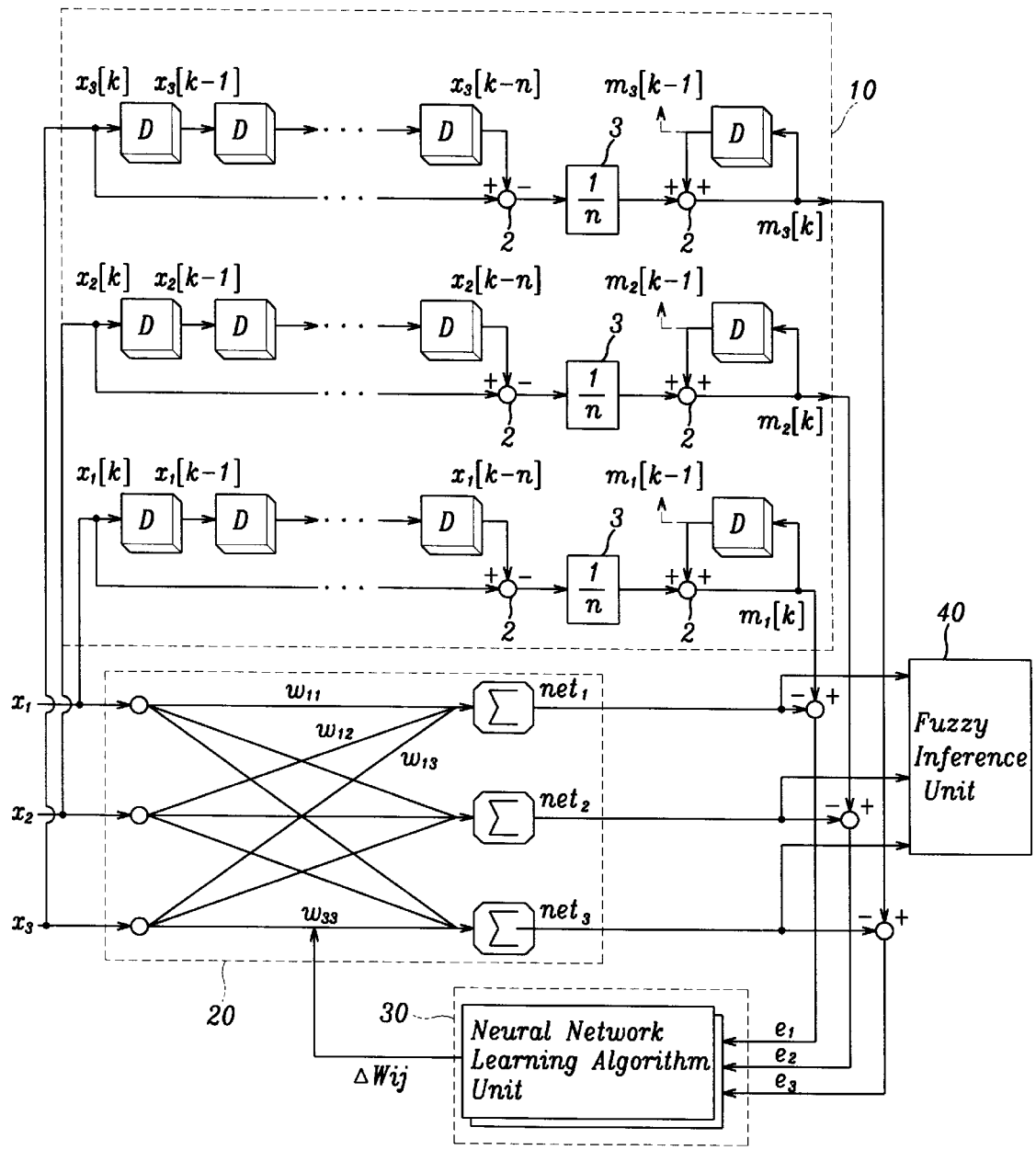
FIG. 5 is a detailed view of the shift pattern decider illustrated in FIG. 2.

FIG. 5 is a detailed view of the shift pattern decider illustrated in FIG. 2.

The driving operation quantities x1[k], x2[k] and x3[k] are inputted to the moving-average calculator 10 and the neural network operator 20 at the same time. Here, the driving operation quantities x1[k], x2[k] and x3[k] indicate accelerator operation quantity, brake operation quantity and steering wheel operation quantity in step k, respectively.

The accelerator operation quantity x1[k], the brake operation quantity x2[k] and the steering wheel operation quantity x3[k] in the step k are obtained by the following expressions respectively.

$$x1[k]=(\theta+\lambda \times d\lambda/dt)_\kappa$$
$$x2[k]=\beta_\kappa$$
$$x3[k]=(D+\alpha \times d\phi/dt)_\kappa$$

where $\theta$ is throttle opening, $\beta_\kappa$ is vehicle deceleration according to a brake operation, $\phi$ is a steering wheel angle, and $\lambda$ and $\alpha$ are scaling factors respectively.

Here, the values of the driving operation quantities x1[k], x2[k] and x3[k] is set to a range between −1 and 1. That is to say, $xi \in \{-1, 1\}$.

The values of the driving operation quantity x1[k], x2[k] and x3[k] are inputted to the moving-average calculator 10 and outputted as each moving-average value, m1[k], m2[k] and m3[k]. In addition, the x1[k], x2[k] and x3[k] are inputted to the neural network operator 20 and outputted as each network operation output value, net1, net2 and net3.

Here, the network output values are obtained by the following expression.

$$\begin{vmatrix} net1 \\ net2 \\ net3 \end{vmatrix} = \begin{vmatrix} w11 & w12 & w13 \\ w21 & w22 & w23 \\ w31 & w32 & w33 \end{vmatrix} \begin{vmatrix} x1 \\ x2 \\ x3 \end{vmatrix}$$

where wij (i=1, 2, 3, j=1, 2, 3) is a weighing coefficient, and $wij \in \{0, 1\}$.

Differences, error signals e1, e2 and e3 between the network output values and the moving-average values m1, m2 and m3 are inputted to the neural network learning algorithm unit 30 and learned, and the learning algorithm unit 30 outputs update weighting coefficient $\Delta$wij.

Here, the update weighting coefficient is obtained by the expression, $$\Delta wij = \eta * ei. * xj \text{ where } \eta \text{ is a learning rate.}$$

The update weighting coefficient $\Delta$wij is added to the weighting coefficient wij, thereby producing modified weighting coefficient wij'. That is to say, wij'=wij+$\Delta$wij, and the network operation is performed by the modified weighting coefficient wij'.

The network operation value is inputted to the fuzzy inference unit 40, and the fuzzy inference unit 40 infers the optimal shift pattern from a following method.

First, the fuzzy inference unit 40 obtains fuzzy deciding values, df[4], df[3], df[2] and df[1] of the shift pattern by the following expressions.

df[4]=[min{net1, net2, net3}+1]/2
df[3]=[min{net1, (1−net2), net 3}+1]/2
df[2]=[min{net1, net2, (1 −net 3)}+1]/2
df[1]=[min{(1−net1), (1−net2), (1−net3)}+1]/2

Here, function min{net1, net2, net3} defines the least value among net1, net2, and net3, and df[i] is in the range between 0 and 1, that is to say, $0 \leq df[i] \leq 1$.

The fuzzy deciding values are calculated by centroid defuzzification by the following expression.

$$SP' = \frac{\sum_{i=1}^{4} df[i] \times i}{\sum_{i=1}^{4} df[i]}$$

Where, SP' is a real number value in the range between 1 to 4, that is to say, $1 \leq SP' \leq 4$.

It is decided which one is the optimal shift pattern among SP1, SP2, SP3 and SP4 by rounding off the SP'. The values of SP1, SP2, SP3 and SP4 are defined as 1, 2, 3 and 4 by rounding off SP' respectively.

Here. SP1 represents the driving habit of a driver as a result of the frequent use of an accelerator, a brake and a steering wheel, SP2 represents the driving habits of a driver as a result of the frequent use of an accelerator and a steering wheel, SP3 represents the driving habits of a driver as a result of the frequent use of an accelerator and a brake, SP4 represents the steady and calm driving of a driver through the normal use of an accelerator, a brake and a steering wheel.

As described above, the shift pattern decider decides the optimal shift pattern suitable for the driving habit of the driver using the driving operation quantities.

Next, the shift pattern decider according to a second embodiment of the present invention is explained with reference to FIGS. 6 and 7.

Figure 6:
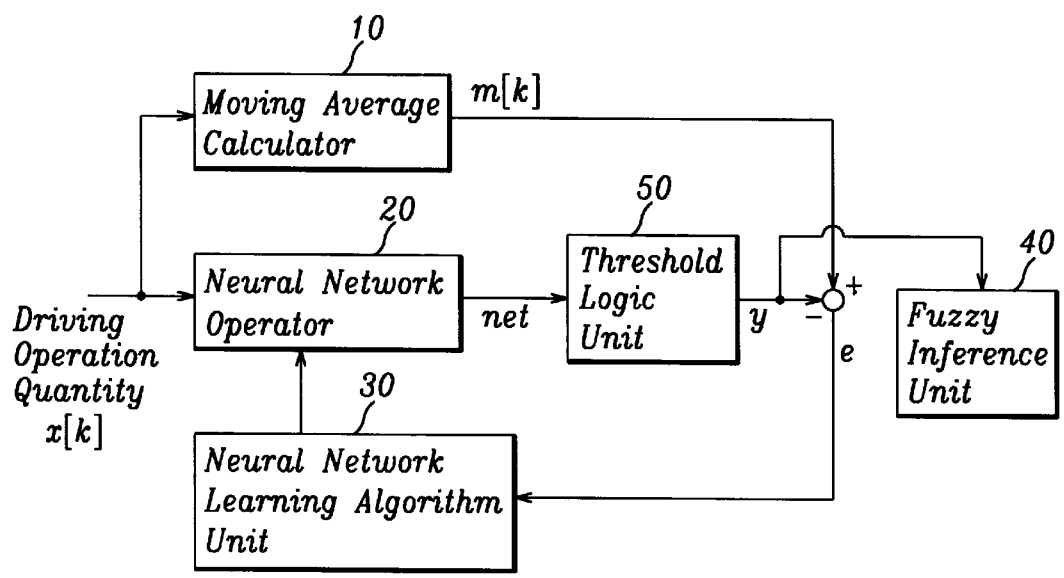
FIG. 6 is a block diagram of a shift pattern decider according to a second embodiment of the present invention.

FIG. 6 is a block diagram of the shift pattern decider 200 according to a second embodiment of the present invention.

In FIG. 6, the shift pattern decider 200 includes the moving-average calculator 10, the neural network operator 20, the neural network learning algorithm unit 30, a threshold logic unit 50 and the fuzzy inference unit 40.

In FIG. 6, the same reference numerals are indicated to portions which perform the same functions as those in FIG. 2, and explanation therefore is omitted.

A net value outputted from the neural network operator 20 is inputted to the threshold logic unit 50. The threshold logic unit 50 outputs 1 when the net value is greater than a threshold value after comparing the inputted net value with the predetermined threshold value, and outputs 0 when the net value is less than the threshold value.

A difference, an error signal e(=m[k]−y) between the moving-average value m[k] outputted from the moving-average calculator 10 and an output value, y outputted from the threshold logic unit 50, is inputted to the neural network learning algorithm unit 30. The neural network learning algorithm unit 30 performs learning algorithm using the error signal, and feeds back the result to the neural network operator 20.

The output value, y outputted from the threshold logic unit 50 is inputted to the fuzzy inference unit 40, and the fuzzy inference unit 40 decides the optimal shift pattern suitable for the driving habit of the driver based on the output value, y.

Unlike the shift pattern decider illustrated in FIG. 2, the shift pattern decider illustrated in FIG. 6 can obtain easily and simply the optimal shift pattern suitable for the driving habit of the driver since the shift pattern decider obtains a simple logic value, y of 1 or 0 from the neural network output value, net, performs the neural network learning algorithm using the logic value, y, and performs the fuzzy inference.

Figure 7:
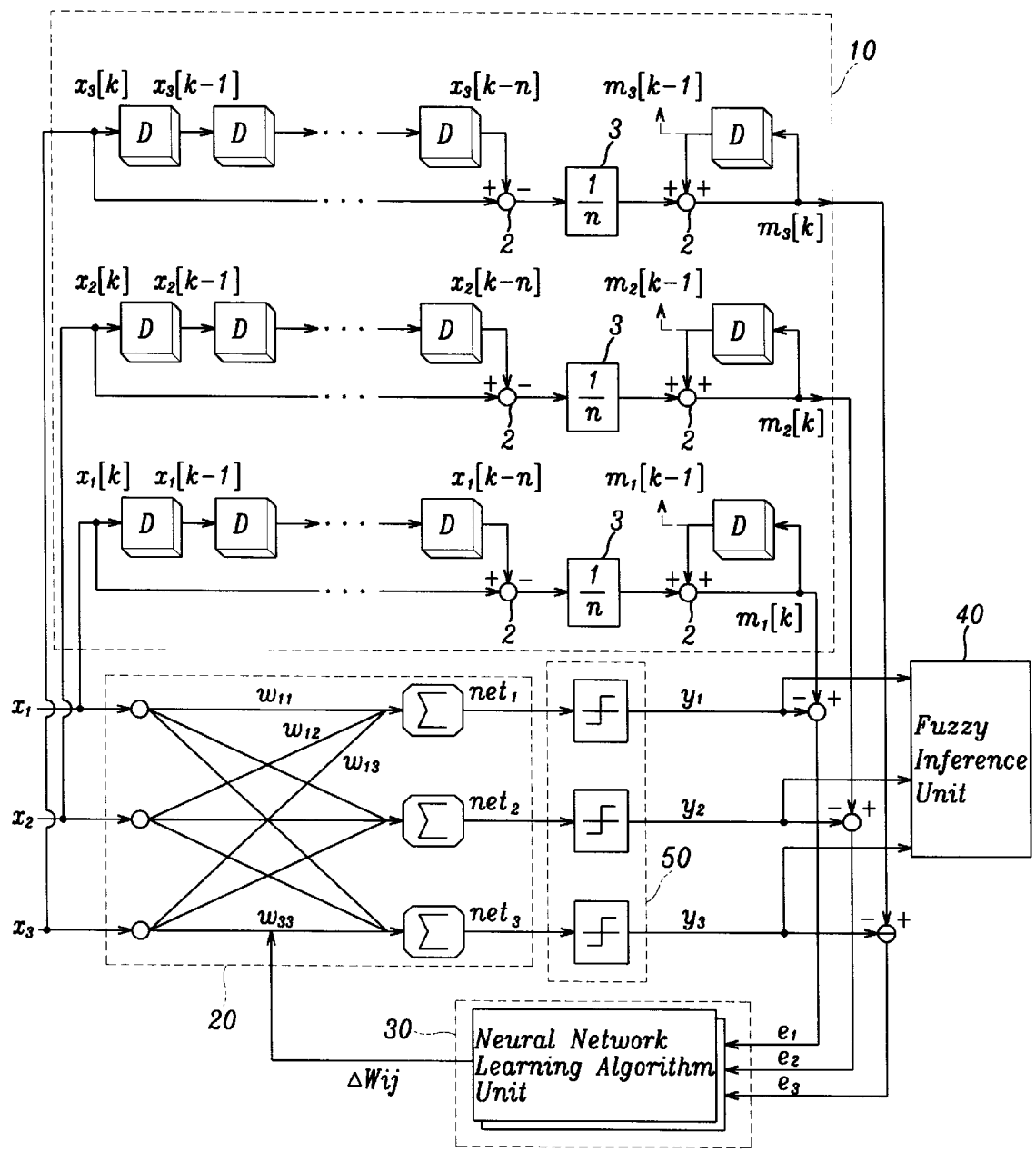
FIG. 7 is a detailed view of the shift pattern decider illustrated in FIG. 6.

FIG. 7 is a detailed view of the shift pattern decider illustrated in FIG. 6.

In FIG. 7, the same reference numerals are indicated to portions which perform the same functions as those in FIG. 3, and explanation therefor is omitted.

The output values, net1, net2 and net3 outputted from the neural network operator 20 are inputted to the logic threshold unit 50, whereby y1, y2 and y3 are outputted therefrom.

The threshold logic unit 50 outputs 1 when the network output value is greater than the threshold value after comparing the inputted network value with the threshold value, and outputs 0 when the network output value is less than the threshold value. In FIG. 7, the threshold value is set to 0.5.

Differences, error signals e1, e2 and e3 between the moving-average values m1, m2 and m3 outputted from the moving-average calculator 10 and the logic values, y1, y2 and y3 outputted from the threshold logic unit 50, are inputted to the neural network learning algorithm unit 30, learned, and fed back to the neural network operator 20.

The logic values y1, y2 and y3 are inputted to the fuzzy inference unit 40, and the optimal shift pattern is inferred.

The method for inferring the optimal shift pattern is almost the same as that explained in FIG. 3, and it is the only difference that the logic values, y1, y2 and y3 are used instead of the net1, net 2, and net 3.

Accordingly, the shift pattern decider illustrated in FIGS. 6 and 7 can decide simply and easily the optimal shift pattern suitable for the driving habit of the driver since the fuzzy inference is performed and the neural network learning algorithm is performed using the logic values of 0 or 1, y1, y2 and y3.

As described above, the apparatus for deciding a shift pattern suitable for driver's driving habit using neural network operation and fuzzy inference and a control method thereof according to the present invention can decide the optimal shift pattern by performing the fuzzy inference from the output values learned by the neural network since the apparatus of the present invention performs the neural network operation by inputting the driver's driving operation quantity as a deciding condition of the shift pattern and performs the fuzzy inference from the output from the neural network operation.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A shift pattern deciding apparatus, comprising:

a driving operation quantity sensor for sensing a driver's driving operation quantity and outputting a driving operation quantity vector X[k];

a moving-average calculator for receiving the vector X[k] and calculating moving-average vector M[k];

a network operator for receiving the vector X[k], performing a neural network operation, and outputting a network output vector NET, wherein the network operator outputs the network output vector NET by multiplying the driving operation quantity vector X[k] by an update weighting coefficient matrix W;

a neural network learning algorithm unit for receiving an error vector E, wherein the error vector E corresponds to the vector M[k] minus the vector NET, and wherein the neural network learning algorithm performs neural network learning and feeds back a learned result to the network operator, and wherein the neural network learning algorithm unit obtains an update weighting coefficient matrix dW by multiplying the error vector E by a learning rate η, and adds the update weighting coefficient matrix dW to the weighting coefficient matrix W by feeding back the update weighting coefficient matrix dW to the network operator; and a fuzzy inference unit for receiving the network output vector NET, performing fuzzy inference, and deciding an optimal shift pattern suitable for a driving habit of the driver, and wherein the moving-average vector M[k] is obtained by the following expression, using the driving operation quantity vector X[k] and an n delay driving operation quantity vector X[k−n] which the driving operation vector X[k] is delayed by n:

$M[k]=M[k-1]+1/n(X[k]-X[k-n])$.

2. The shift pattern deciding apparatus of claim 1, wherein the driving operation quantity vector includes accelerator operation quantity x1[k], brake operation quantity x2[k], and steering wheel operation quantity x3[k].

3. The shift pattern deciding apparatus of claim 2, wherein the accelerator operation quantity x1[k] is defined by a sum of throttle opening and a throttle opening speed;

the brake operation quantity x2[k] is defined by a vehicle deceleration according to the brake operation; and the steering wheel operation quantity x3[k] is defined by an angle of the steering wheel and angular velocity of the steering wheel.

4. The shift pattern deciding apparatus of claim 1, wherein the moving-average calculator is formed by a ring buffer.

5. A shift pattern deciding apparatus, comprising:

a driving operation quantity sensor for sensing a driver's driving operation quantity and outputting driving operation quantity vector X[k];

a moving-average calculator for receiving the vector X[k] and calculating a moving-average vector M[k];

a network operator for receiving the vector X[k], performing a neural network operation, and outputting a network output vector NET, and wherein the network operator outputs the network output vector NET by multiplying the driving operation quantity vector X[k] by an update weighting coefficient matrix W;

a threshold logic unit for receiving the network output vector NET, and outputting logic vector Y of 0 or 1 after comparing the inputted network output vector NET with a predetermined threshold value;

a neural network learning algorithm unit for receiving an error vector E, wherein the error vector E corresponds to the vector M[k] minus the vector Y, wherein the neural network learning algorithm unit performs a neural network learning and feeds back a learned result to the network operator, and wherein the neural network learning algorithm unit obtains an update weighting coefficient matrix dW by multiplying the error vector E by a learning rate η, and adds the update weighting coefficient matrix dW to the weighting coefficient matrix W by feeding back the update weighting coefficient matrix dW to the neural network operator; and a fuzzy inference unit for receiving the vector Y, performing fuzzy inference, and deciding an optimal shift pattern suitable for a driving habit of the driver, and wherein the moving-average vector M[k] is obtained by the following expressions using the driving operation quantity vector X[k] and an n delay driving operation quantity vector X[k−n] which the driving operation X[k] is delayed by n:

$$M[k]=M[k-1]+1/n(X[k]-X[k-n]).$$

6. The shift pattern deciding apparatus of claim 5, wherein the driving operation quantity vector includes accelerator operation quantity x1[k], brake operation quantity x2[k], and steering wheel operation quantity x3[k].

7. The shift pattern deciding apparatus of claim 6, wherein the accelerator operation quantity x1[k] is defined by a sum of a throttle opening and a throttle opening speed;

the brake operation quantity x2[k] is defined by a vehicle deceleration according to the brake operation; and the steering wheel operation quantity x3[k] is defined by an angle of the steering wheel and angular velocity of the steering wheel.

8. The shift pattern deciding apparatus of claim 5, wherein the moving-average calculator is formed by a ring buffer.

9. A method for deciding a shift pattern, comprising the steps of:

sensing a driver's driving operation quantity and outputting a driving operation quantity vector X[k];

receiving the vector X[k] and calculating a moving-average vector M[k];

outputting the network output vector NET by multiplying the driving operation quantity vector X[k] by an update weighting coefficient matrix W;

outputting logic vector Y of 0 or 1 after comparing the inputted network output vector NET with a predetermined threshold value;

obtaining an error vector E which subtracts the vector Y from the vector M[k], and obtaining an update weighting coefficient matrix dW by multiplying the error vector E by a learning rate η;

modifying the weighting coefficient matrix by adding the update weighting coefficient matrix dW to the weighting coefficient matrix W; and receiving the logic vector Y, performing fuzzy inference, and deciding an optimal shift pattern suitable for a driving habit of the driver.

10. The method for deciding a shift pattern of claim 9, wherein the moving-average vector M[k] is obtained by the following expression using the driving operation quantity x[k] and n delay driving operation quantity vector X[k−n] which the driving operation vector x[k] is delayed by n:

$$M[k] = M[k-1] + \frac{1}{n}(X[k] - X[k-n]).$$

11. The method for deciding a shift pattern of claim 10, wherein the driving operation quantity vector includes accelerator operation quantity x1[k], brake operation quantity x2[k], and steering wheel operation quantity x3[k].

12. The method for deciding a shift pattern of claim 11, wherein the accelerator operation quantity x1[k] is defined by a sum of a throttle opening and a throttle opening speed;

the brake operation quantity x2[k] is defined by a vehicle deceleration according to the brake operation; and the steering wheel operation quantity x3[k] is defined by an angle of the steering wheel and angular velocity of the steering wheel.

* * * * *